(12) United States Patent
Bouten

(10) Patent No.: US 12,380,821 B2
(45) Date of Patent: Aug. 5, 2025

(54) METHOD AND SETUP FOR PERFORMING A SERIES OF OPTICAL MEASUREMENTS WITH A 2D IMAGING SYSTEM

(71) Applicant: ADMESY B.V., Ittervoort (NL)

(72) Inventor: Ruud Martin Jozef Bouten, Ittervoort (NL)

(73) Assignee: ADMESY B.V., Ittervoort (NL)

( * ) Notice: Subject to any disclaimer, the term of this patent is extended or adjusted under 35 U.S.C. 154(b) by 327 days.

(21) Appl. No.: 17/923,404

(22) PCT Filed: Apr. 30, 2021

(86) PCT No.: PCT/EP2021/061397
§ 371 (c)(1),
(2) Date: Nov. 4, 2022

(87) PCT Pub. No.: WO2021/224126
PCT Pub. Date: Nov. 11, 2021

(65) Prior Publication Data
US 2023/0245294 A1 Aug. 3, 2023

(30) Foreign Application Priority Data
May 6, 2020 (EP) .................................... 20173221

(51) Int. Cl.
*G09G 3/00* (2006.01)
*G06T 7/00* (2017.01)
*G06T 7/90* (2017.01)

(52) U.S. Cl.
CPC .......... *G09G 3/006* (2013.01); *G06T 7/0004* (2013.01); *G06T 7/90* (2017.01);
(Continued)

(58) Field of Classification Search
None
See application file for complete search history.

(56) References Cited

U.S. PATENT DOCUMENTS 6,452,627 B1 * 9/2002 Hamaguri .............. H04N 17/04
348/E17.005
6,633,301 B1 * 10/2003 Dallas .................. G09G 3/3413
345/84
(Continued)

FOREIGN PATENT DOCUMENTS

CN 102318001 A 1/2012
CN 103765503 A 4/2014
(Continued)

OTHER PUBLICATIONS

Office Action dated Jul. 30, 2024 for corresponding Chinese Application 2020180047609.2 with machine translation.
(Continued)

*Primary Examiner* — Fred Tzeng
(74) *Attorney, Agent, or Firm* — Hudak, Shunk & Farine Co. LPA

(57) ABSTRACT

A method for performing a series of optical measurements on an activated display, whether or not it has already been mounted in an actual display device, the activated display having an optical characteristic with a performance that changes during and/or between the measurements of the series of optical measurements that are configured as a sequence of measurements comprising a pair of identical 2D image measurements or a pair of identical spot measurements in combination with a 2D image measurement to determine at least one of luminance, color-point and spectral distribution of emitted light, and the distributions of luminance and color-point over the entire light-emitting area of the activated display with an improved accuracy. An optical measurement setup for performing the series of optical measurements in accordance with the method.

7 Claims, 6 Drawing Sheets

(52) U.S. Cl.
CPC .............. *G06T 2207/10024* (2013.01); *G09G 2320/0233* (2013.01); *G09G 2320/0242* (2013.01); *G09G 2320/041* (2013.01); *G09G 2320/0666* (2013.01); *G09G 2320/0693* (2013.01)

(56) References Cited

U.S. PATENT DOCUMENTS

| | | | | |
|---|---|---|---|---|
| 7,692,866 | B2* | 4/2010 | Maximus | G02B 27/285 |
| | | | | 359/640 |
| 9,147,362 | B2 | 9/2015 | Znamenskiy | G09G 3/3413 |
| 9,373,178 | B2* | 6/2016 | Gilbert | G02F 1/133514 |
| 9,501,982 | B2* | 11/2016 | Ukawa | G09G 3/36 |
| 9,704,274 | B2* | 7/2017 | Gilbert | G06T 11/001 |
| 9,736,470 | B2* | 8/2017 | Kosuge | H04N 17/04 |
| 9,741,295 | B2* | 8/2017 | Kimoto | G09G 3/3607 |
| 10,748,275 | B2* | 8/2020 | Chudoba | G06T 7/40 |
| 10,861,398 | B2* | 12/2020 | El-Ghoroury | G09G 3/32 |
| 10,895,777 | B1* | 1/2021 | Lin | G02F 1/133624 |
| 11,033,185 | B2* | 6/2021 | Wittnebel | A61B 3/0025 |
| 11,189,811 | B2* | 11/2021 | Wu | H10K 50/125 |
| 11,699,001 | B2* | 7/2023 | Palmer | G06F 30/13 |
| | | | | 703/1 |
| 11,722,642 | B2* | 8/2023 | Oostendorp | G06T 7/0004 |
| | | | | 348/92 |
| 11,993,274 | B2* | 5/2024 | Krutsch | B60W 50/04 |
| 12,048,415 | B2* | 7/2024 | Ogino | H04N 9/74 |
| 2005/0201611 | A1* | 9/2005 | Lloyd, Jr. | F01D 5/141 |
| | | | | 382/152 |
| 2007/0035707 | A1* | 2/2007 | Margulis | H04N 9/312 |
| | | | | 353/122 |
| 2007/0120786 | A1* | 5/2007 | Bellls, II | G09G 3/3413 |
| | | | | 345/84 |
| 2012/0299967 | A1* | 11/2012 | Urabe | G06T 1/20 |
| | | | | 345/660 |
| 2013/0229511 | A1* | 9/2013 | Oostendorp | H04N 7/181 |
| | | | | 348/92 |
| 2014/0168414 | A1* | 6/2014 | Brumovsky | G06T 7/521 |
| | | | | 382/152 |
| 2014/0333593 | A1* | 11/2014 | Nagashima | G09G 3/3426 |
| | | | | 345/207 |
| 2014/0340374 | A1 | 11/2014 | Ukawa et al. | |
| 2015/0287370 | A1* | 10/2015 | Takanashi | G09G 3/3611 |
| | | | | 345/88 |
| 2015/0325177 | A1 | 11/2015 | Takanashi | |
| 2016/0165200 | A1* | 6/2016 | Helt | G03B 43/00 |
| | | | | 348/182 |
| 2019/0052872 | A1* | 2/2019 | Shyshkin | G09G 3/006 |
| 2019/0057672 | A1* | 2/2019 | Yen | G09G 3/2003 |
| 2019/0089932 | A1* | 3/2019 | Oostendorp | H04N 7/181 |
| 2019/0140148 | A1* | 5/2019 | Yoshimura | C09K 11/617 |
| 2019/0238809 | A1* | 8/2019 | Davies | G09G 3/3413 |
| 2019/0317362 | A1* | 10/2019 | Huang | G02F 1/133603 |
| 2019/0348588 | A1* | 11/2019 | Hsieh | H01L 33/62 |
| 2020/0243042 | A1* | 7/2020 | Su | G09G 5/02 |
| 2023/0066094 | A1* | 3/2023 | Gillette | G02F 1/133524 |
| 2023/0074182 | A1* | 3/2023 | Haag | H10K 50/86 |
| 2023/0131950 | A1* | 4/2023 | Madmon | G03F 1/84 |
| | | | | 382/144 |
| 2024/0176922 | A1* | 5/2024 | Palmer | G06T 11/203 |

FOREIGN PATENT DOCUMENTS

| | | |
|---|---|---|
| CN | 109389945 A | 2/2019 |
| EP | 0562976 A1 | 9/1993 |
| KR | 20190074847 A | 6/2019 |
| WO | 2013118304 A1 | 8/2013 |
| WO | 2016203902 A1 | 12/2016 |

OTHER PUBLICATIONS

Korean Office Action dated Dec. 3, 2024 for corresponding Korean Application 2024-104257269.

Japanese Office Action dated Jan. 21, 2025 for corresponding Japan Application 2022-567608.

* cited by examiner

METHOD AND SETUP FOR PERFORMING A SERIES OF OPTICAL MEASUREMENTS WITH A 2D IMAGING SYSTEM

FIELD OF THE INVENTION

The present invention relates to a method for performing a series of optical measurements with a 2D imaging system on an activated display. The invention further relates to an optical measurement setup comprising a 2D imaging system and a processor that are configured and arranged to perform the method according to the invention.

BACKGROUND OF THE INVENTION

In electronic devices, wearable or non-wearable, digital display technology is widespread. Television sets, computer monitors, telephones, test equipment, watches, an almost endless list can be conceived wherein displays are used. In the context of the present invention, any device comprising a display is construed and referred to as a display device. Displays incorporated in display devices may be manufactured using for example LCD technology in combination with backlighting. Alternatively, displays may be manufactured using LED or OLED technology, wherein each pixel of the display is formed by a single light source or a combination of light sources, e.g. a combination of red, green and blue light sources. Commonly, the pixels are arranged in a 2D array that extends up to the boundaries of the display.

Displays can have various shapes and sizes. Commonly, displays have a rectangular shape, however depending on the specific application and design of the display device in which they are mounted, displays can have different shapes, such as round shapes for application in watches.

For a new generation of a display device, amongst others, the performance of at least some optical characteristics of the display used in it needs to be improved compared to the previous generation. Examples of such optical characteristics that are of particular interest in the context of the present invention are luminance, color-point and spectral distribution.

Based on the above, testing of optical characteristics of actuated displays is very important, in particular, testing of activated displays that have already been mounted in actual display devices. In production line environments, testing of optical characteristics of activated displays that have already been mounted in actual display devices is commonly done using 2D imaging systems. Known optical measurement methods involving 2D imaging systems are configured either to perform multiple 2D measurements using a camera and different filters for each measurement or to perform a reference spot measurement with a spectrometer or a colorimeter, and a 2D measurement with a camera.

A problem associated with the above-mentioned known optical measurement methods involving 2D imaging systems is that values for optical characteristics of activated displays, especially but not exclusively activated displays that have already been mounted in actual display devices, cannot be determined with the required measurement accuracy if the performance of the optical characteristics of the activated displays changes during and/or between the measurements. The aforementioned changes can for example be caused by transients in the control currents and voltages. Another cause for the changes in the performance of the optical characteristics of the activated displays during and/or between the measurements can for example be temperature gradients. In the case of displays that have already been mounted in a display device, temperature gradients can for example be due to constructional aspects of the display devices, for example proximity of a heat generating unit such as a battery to the display. An example of the latter is that the temperature of the display can vary over time due to variations in the heat generated by the battery depending on the usage of the display device over time. In the event that the display device is switched on to activate the display for testing using the above-mentioned 2D imaging system, the temperature of the display will change until an equilibrium has been reached. Testing can be performed after such equilibrium has been established. However, this gives rise to waiting times that may have a negative impact on the speed of testing and therefore on the throughput of the production line. Moreover, even if testing is performed only after an equilibrium has been reached, temperature gradients that disturb the established equilibrium can still occur during and/or between measurements, for example due to variations in heat generated by the battery.

Based on the above, there is a need for a method for performing optical measurements with a 2D imaging system that enables values for optical characteristics of activated displays, whether or not they have already been mounted in actual display devices, to be determined quickly and with the required measurement accuracy, despite the fact that the performance of the optical characteristics of the activated displays changes during and/or between the measurements.

SUMMARY OF THE INVENTION

It is an object of the present invention to provide a method for performing a series of optical measurements with a 2D imaging system on an activated display that has an optical characteristic with a performance that changes during and/or between the measurements of the series of optical measurements that pre-empts or at least reduces at least one of the abovementioned and/or other disadvantages associated with optical measurement methods involving 2D imaging systems known in the art.

Aspects of the present invention are set out in the accompanying independent and dependent claims. Features from the dependent claims may be combined with features from the independent claim as appropriate and not merely as explicitly set out in the claims.

At least one of the abovementioned objects is achieved by a method for performing a series of optical measurements with a 2D imaging system on an activated display that has an optical characteristic with a performance that changes during and/or between the measurements of the series of optical measurements, wherein an improved comparability is achieved for values for the optical characteristic that are determined based on measurement results for the optical characteristic that are obtained by performing the series of optical measurements, the method comprising:

configuring the 2D imaging system to perform each optical measurement of the series of optical measurements as a sequence of measurements to obtain for each optical measurement a respective set of measurement results for the optical characteristic; and determining for each optical measurement of the series of optical measurements a respective value for the optical characteristic by performing time-averaging of the measurement results of the respective set of measurement results of the respective optical measurement.

The person skilled in the art will appreciate that optical characteristics of the activated display that in the context of the present invention are of particular interest are luminance, color-point and spectral distribution. In addition, the person skilled in the art will appreciate that the 2D imaging system comprises at least one camera and at least one optical filter. The method according to the invention enables an improved comparability of values that are determined for the above-mentioned optical characteristics of an activated display, whether or not the display has already been mounted in an actual display device, despite the fact that the performance of the optical characteristics of the activated display changes during and/or between the measurements. As a result, the measurement accuracy with which the values for the optical characteristic of interest can be determined is improved. Consequently, the optical performance of the activated displays can be characterized and controlled more accurately.

Moreover, by using the method according to the invention it is not necessary to wait until the display is in an equilibrium state after switching it on before the measurements according to the method of the invention can be performed. Therefore, the method according to the invention also enables quick determination of values for the optical characteristics of the activated display with an improved accuracy compared to methods known in the art. Therefore, the method according to the invention has a positive effect on the speed of in-line testing, i.e. testing of the optical performance of activated displays in a production line, and therefore on the throughput of the production line.

In an embodiment of the method according to the invention, the step of configuring the 2D imaging system to perform each optical measurement of the series of optical measurements as a sequence of measurements to obtain for each optical measurement a respective set of measurement results for the optical characteristic comprises:

determining a total time interval during which the series of optical measurements is performed by adding up the respective time intervals during which each respective optical measurement of the series of optical measurements is performed;

configuring the sequence of measurements to comprise at least one pair of identical 2D image measurements, wherein a first 2D image measurement of a first pair of identical 2D image measurements is performed during a first time interval using a first optical filter of a first type to obtain a first measurement result of the set of measurement results, and a second 2D image measurement of the first pair of identical 2D image measurements is performed during a second time interval using said first optical filter of the first type to obtain a second measurement result of the set of measurement results, wherein the first time interval and the second time interval are non-overlapping and mirrored with respect to the center of the total time interval.

By arranging the first time interval and the second time interval in the above-mentioned way, the improved comparability of the first measurement result and the second measurement result of the set of measurement results obtained from the first pair of identical 2D image measurements can be achieved by the above-mentioned time-averaging of the first measurement result and the second measurement result. Due to the time-averaging, influences on the first measurement result and the second measurement result, which are obtained by the first pair of identical 2D image measurements, that are caused by changes in the performance of the optical characteristic of interest occurring during and/or between the measurements of the first pair of identical 2D image measurements can be reduced or ideally be eliminated. As a result of the improved comparability of the measurement results of the first pair of identical 2D image measurements, the measurement accuracy with which the values for the optical characteristic of interest can be determined based on the first measurement result and the second measurement result can be improved.

The person skilled in the art will appreciate that the measurements of the first pair of 2D image measurements are identical in the sense that they are performed in an identical way using the same first optical filter of the first type. It will be clear that the first optical filter of the first type can be any suitable RGB filter or XYZ filter.

The person skilled in the art will appreciate that the above-mentioned measurement sequence encompassing the first 2D image measurement and the second 2D image measurement of the first pair of identical 2D image measurements can be performed for any given color, such as red, green, blue or any mixture of these colors. For example, the above-mentioned first sequence of 2D image measurements can be performed on an activated display on which a test image is displayed that causes the entire light-emitting area of the activated display to emit red light. Using a red filter for the first optical filter of the first type, the first sequence of 2D image measurements can then be performed to determine at least one of the luminance, color-point and spectral distribution of the emitted red light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the sequence of measurements is configured to comprise a second pair of identical 2D image measurements, wherein a third 2D image measurement of the second pair of identical 2D image measurements is performed during a third time interval using a second optical filter of a second type to obtain a third measurement result of the set of measurement results, and a fourth 2D image measurement of the second pair of identical 2D image measurements is performed during a fourth time interval using said second optical filter of the second type to obtain a fourth measurement result of the set of measurement results, wherein the third time interval and the fourth time interval of the second pair of identical 2D image measurements are non-overlapping neither with each other nor with the first time interval and the second time interval of the first pair of identical 2D image measurements, and wherein the third time interval and the fourth time interval of the second pair of identical 2D image measurements are also mirrored with respect to the center of the total time interval.

By arranging the third time interval and the fourth time interval in the above-mentioned way, the improved comparability of the third measurement result and the fourth measurement result of the set of measurement results obtained from the second pair of identical 2D image measurements can be achieved by the above-mentioned time-averaging of the third measurement result and the fourth measurement result. Due to the time-averaging, influences on the third measurement result and the fourth measurement result, which are obtained by the second pair of identical 2D image measurements, that are caused by changes in the performance of the optical characteristic of interest occurring during and/or between the measurements of the second pair of identical 2D image measurements can be reduced or ideally be eliminated. As a result of the improved comparability of the measurement results of the second pair of identical 2D image measurements, the measurement accuracy with which the values for the optical characteristic of interest can be determined based on the third measurement result and the fourth measurement result can be improved.

The person skilled in the art will appreciate that the measurements of the second pair of 2D image measurements are identical in the sense that they are performed in an identical way using the same second optical filter of the second type. It will be clear that the second optical filter of the second type can be any suitable RGB filter or XYZ filter that is different from the RGB filter or XYZ filter used as the first optical filter.

The person skilled in the art will appreciate that the above-mentioned measurement sequence encompassing the third 2D image measurement and the fourth 2D image measurement of the second pair of identical 2D image measurements can be performed for any given color, such as red, green, blue or any mixture of these colors. For example, the above-mentioned second sequence of 2D image measurements can be performed on an activated display on which a test image is displayed that causes the entire light-emitting area of the activated display to emit green light. Using a green filter for the second optical filter of the second type, the second sequence of 2D image measurements can then be performed to determine at least one of the luminance, color-point and spectral distribution of the emitted green light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the sequence of measurements is configured to comprise a third pair of identical 2D image measurements, wherein a fifth 2D image measurement of the third pair of identical 2D image measurements is performed during a fifth time interval using a third optical filter of a third type to obtain a fifth measurement result of the set of measurement results, and a sixth 2D image measurement of the third pair of identical 2D image measurements is performed during a sixth time interval using said third optical filter of the third type to obtain a sixth measurement result of the set of measurement results, wherein the fifth time interval and the sixth time interval of the third pair of identical 2D image measurements are non-overlapping neither with each other nor with the first time interval and the second time interval of the first pair of identical 2D image measurements and the third time interval and the fourth time interval of the second pair of identical 2D image measurements, and wherein the fifth time interval and the sixth time interval of the third pair of identical 2D image measurements are also mirrored with respect to the center of the total time interval.

By arranging the fifth time interval and the sixth time interval in the above-mentioned way, the improved comparability of the fifth measurement result and the sixth measurement result of the set of measurement results obtained from the third pair of identical 2D image measurements can be achieved by the above-mentioned time-averaging of the fifth measurement result and the sixth measurement result. Due to the time-averaging, influences on the fifth measurement result and the sixth measurement result, which are obtained by the third pair of identical 2D image measurements, that are caused by changes in the performance of the optical characteristic of interest occurring during and/or between the measurements of the third pair of identical 2D image measurements can be reduced or ideally be eliminated. As a result of the improved comparability of the measurement results of the third pair of identical 2D image measurements, the measurement accuracy with which the values for the optical characteristic of interest can be determined based on the fifth measurement result and the sixth measurement result can be improved.

The person skilled in the art will appreciate that the measurements of the third pair of 2D image measurements are identical in the sense that they are performed in an identical way using the same third optical filter of the third type. It will be clear that the third optical filter of the third type can be any suitable RGB filter or XYZ filter that is different from both the RGB filter or XYZ filter used as the first optical filter and the RGB filter or XYZ filter used as the second optical filter.

The person skilled in the art will appreciate that the above-mentioned measurement sequence encompassing the fifth 2D image measurement and the sixth 2D image measurement of the third pair of identical 2D image measurements can be performed for any given color, such as red, green, blue or any mixture of these colors. For example, the above-mentioned third sequence of 2D image measurements can be performed on an activated display on which a test image is displayed that causes the entire light-emitting area of the activated display to emit blue light. Using a blue filter for the third optical filter of the third type, the third sequence of 2D image measurements can then be performed to determine at least one of the luminance, color-point and spectral distribution of the emitted blue light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the step of configuring the 2D imaging system to perform each optical measurement of the series of optical measurements as a sequence of measurements to obtain for each optical measurement a respective set of measurement results for the optical characteristic comprises:
    configuring the sequence of measurements to comprise at least one pair of identical spot measurements and a first 2D image measurement, wherein a first spot measurement of a first pair of identical spot measurements is performed during a first time interval to obtain a first measurement result of the set of measurement results, a second spot measurement of the first pair of identical spot measurements is performed during a second time interval to obtain a second measurement result of the set of measurement results, and the first 2D image measurement is performed during a third time interval using a first optical filter of a first type to obtain a third measurement result of the set of measurement results, wherein the first time interval, the second time interval and the third time interval are non-overlapping and wherein the first time interval and the second time interval are mirrored with respect to the center of the third time interval.

By arranging the first time interval, the second time interval and the third time interval in the above-mentioned way, the improved comparability of the first measurement result and the second measurement result of the set of measurement results obtained from the first pair of identical spot measurements can be achieved by the above-mentioned time-averaging of the first measurement result and the second measurement result. Due to the time-averaging, influences on the first measurement result and the second measurement result, which are obtained by the first pair of identical spot measurements, that are caused by changes in the performance of the optical characteristic of interest occurring during and/or between the measurements of the first pair of identical spot measurements can be reduced or ideally be eliminated. As a result of the improved comparability of the measurement results of the first pair of identical spot measurements, the measurement accuracy with which the values for the optical characteristic of interest can be determined based on the first measurement result and the second measurement result can be improved. The person skilled in the art will appreciate that the measurements of the first pair of spot measurements are identical in the sense that they are performed using identical settings.

In addition, due to the above-mentioned time-averaging, the first measurement result and the second measurement result of the set of measurement results have virtually been obtained at a time that coincides with the center of the third time interval during which the first 2D image measurement was performed to obtain the third measurement result of the set of measurement results. Hence, the comparability of the first measurement result, the second measurement result and the third measurement result of the set of measurement results has been improved. As a result of the fact that the first measurement result, the second measurement result and the third measurement result of the set of measurement results have been obtained virtually simultaneously and therefore are hardly and ideally not affected by changes in the performance of the optical characteristic of interest that occur during and/or between the measurements of the first pair of identical spot measurements and the first 2D image measurement on the activated display, the measurement accuracy with which the values for the optical characteristic of interest can be determined based on the first measurement result, the second measurement result and the third measurement result of the set of measurement results has been improved. Hence, the method according to the invention enables accurate determination of values for the optical characteristics of the activated display.

The person skilled in the art will appreciate that the above-mentioned first sequence of spot-2D-spot measurements can be performed for any given color, such as red, green, blue or any mixture of these colors. For example, a test image can be displayed on the activated display to render the entire light-emitting area of the activated display to emit red light. The first sequence of spot-2D-spot measurements can then be performed to determine for example at least one of the luminance, color-point and spectral distribution of the emitted red light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the sequence of measurements is configured to comprise a second pair of identical spot measurements and a second 2D image measurement, wherein a third spot measurement of the second pair of identical spot measurements is performed during a fourth time interval to obtain a fourth measurement result of the set of measurement results, a fourth spot measurement of the second pair of identical spot measurements is performed during a fifth time interval to obtain a fifth measurement result of the set of measurement results, and said second 2D image measurement is performed during a sixth time interval using a second optical filter of a second type to obtain a sixth measurement result of the set of measurement results, wherein the fourth time interval, the fifth time interval and the sixth time interval of the second pair of identical spot measurements and said second 2D image measurement, respectively are non-overlapping neither with each other nor with the first time interval, the second time interval and the third time interval of the first pair of identical spot measurements and said first 2D image measurement, respectively, and wherein the fourth time interval and the fifth time interval are mirrored with respect to the center of the sixth time interval.

By arranging the fourth time interval, the fifth time interval and the sixth time interval in the above-mentioned way, the improved comparability of the fourth measurement result and the fifth measurement result of the set of measurement results obtained from the second pair of identical spot measurements can be achieved by the above-mentioned time-averaging of the fourth measurement result and the fifth measurement result. Due to the time-averaging, influences on the fourth measurement result and the fifth measurement result, which are obtained by the second pair of identical spot measurements, that are caused by changes in the performance of the optical characteristic of interest occurring during and/or between the measurements of the second pair of identical spot measurements can be reduced or ideally be eliminated. As a result of the improved comparability of the measurement results of the second pair of identical spot measurements, the measurement accuracy with which the values for the optical characteristic of interest can be determined based on the fourth measurement result and the fifth measurement result can be improved. The person skilled in the art will appreciate that the measurements of the second pair of spot measurements are identical in the sense that they are performed using identical settings.

In addition, due to the above-mentioned time-averaging, the fourth measurement result and the fifth measurement result of the set of measurement results have virtually been obtained at a time that coincides with the center of the sixth time interval during which the second 2D image measurement was performed to obtain the sixth measurement result of the set of measurement results. Hence, the comparability of the fourth measurement result, the fifth measurement result and the sixth measurement result of the set of measurement results has been improved. As a result of the fact that the fourth measurement result, the fifth measurement result and the sixth measurement result of the set of measurement results have been obtained virtually simultaneously and therefore are hardly and ideally not affected by changes in the performance of the optical characteristic of interest that occur during and/or between the measurements of the second pair of identical spot measurements and the second 2D image measurement on the activated display, the measurement accuracy with which the values for the optical characteristic of interest can be determined based on the fourth measurement result, the fifth measurement result and the sixth measurement result of the set of measurement results has been improved. Hence, the method according to the invention enables accurate determination of values for the optical characteristics of the activated display.

The person skilled in the art will appreciate that the above-mentioned second sequence of spot-2D-spot measurements can be performed for any given color, such as red, green, blue or any mixture of these colors. For example, a test image can be displayed on the activated display to render the entire light-emitting area of the activated display to emit green light. The second sequence of spot-2D-spot measurements can then be performed to determine for example at least one of the luminance, color-point and spectral distribution of the emitted green light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the sequence of measurements is configured to comprise a third pair of identical spot measurements and a third 2D image measurement, wherein a fifth spot measurement of the third pair of identical spot measurements is performed during a seventh time interval to obtain a seventh measurement result of the set of measurement results, a sixth spot measurement of the third pair of identical spot measurements is performed during an eighth time interval to obtain an eighth measurement result of the set of measurement results, and said third 2D image measurement is performed during a ninth time interval using a third optical filter of a third type to obtain a ninth measurement result of the set of measurement results, wherein the seventh time interval, the eighth time interval and the ninth time interval of the third pair of identical spot measurements and said third 2D image measurement, respectively are non-overlapping neither with each other nor with any one of the first time interval, the second time interval and the third time interval of the first pair of identical spot measurements and said first 2D image measurement, respectively, and the fourth time interval, the fifth time interval and the sixth time interval of the second pair of identical spot measurements and said second 2D image measurement, respectively, and wherein the seventh time interval and the eighth time interval are mirrored with respect to the center of the ninth time interval.

By arranging the seventh time interval, the eighth time interval and the ninth time interval in the above-mentioned way, the improved comparability of the seventh measurement result and the eighth measurement result of the set of measurement results obtained from the third pair of identical spot measurements can be achieved by the above-mentioned time-averaging of the seventh measurement result and the eighth measurement result. Due to the time-averaging, influences on the seventh measurement result and the eighth measurement result, which are obtained by the third pair of identical spot measurements, that are caused by changes in the performance of the optical characteristic of interest occurring during and/or between the measurements of the third pair of identical spot measurements can be reduced or ideally be eliminated. As a result of the improved comparability of the measurement results of the third pair of identical spot measurements, the measurement accuracy with which the values for the optical characteristic of interest can be determined based on the seventh measurement result and the eighth measurement result can be improved. The person skilled in the art will appreciate that the measurements of the third pair of spot measurements are identical in the sense that they are performed using identical settings.

In addition, due to the above-mentioned time-averaging, the seventh measurement result and the eighth measurement result of the set of measurement results have virtually been obtained at a time that coincides with the center of the ninth time interval during which the third 2D image measurement was performed to obtain the ninth measurement result of the set of measurement results. Hence, the comparability of the seventh measurement result, the eighth measurement result and the ninth measurement result of the set of measurement results has been improved. As a result of the fact that the seventh measurement result, the eighth measurement result and the ninth measurement result of the set of measurement results have been obtained virtually simultaneously and therefore are hardly and ideally not affected by changes in the performance of the optical characteristic of interest that occur during and/or between the measurements of the third pair of identical spot measurements and the third 2D image measurement on the activated display, the measurement accuracy with which the values for the optical characteristic of interest can be determined based on the seventh measurement result, the eighth measurement result and the ninth measurement result of the set of measurement results has been improved. Hence, the method according to the invention enables accurate determination of values for the optical characteristics of the activated display.

The person skilled in the art will appreciate that the above-mentioned third sequence of spot-2D-spot measurements can be performed for any given color, such as red, green, blue or any mixture of these colors. For example, a test image can be displayed on the activated display to render the entire light-emitting area of the activated display to emit blue light. The third sequence of spot-2D-spot measurements can then be performed to determine for example at least one of the luminance, color-point and spectral distribution of the emitted blue light and the distributions of luminance and color-point over the entire light-emitting area of the activated display. The person skilled in the art will appreciate that any suitable test image comprising any color and/or pattern can be used.

Furthermore, the person skilled in the art will appreciate that for any one of the above-mentioned optical characteristics of interest, i.e. luminance, color-point, or spectral distribution, x and y chromaticity coordinates in accordance with the CIE 1931 xy chromaticity diagram can be determined based on the determined values for the optical characteristic of interest.

In an embodiment of the method according to the invention, the optical characteristic of the activated optical display is one of luminance, color-point and spectral distribution, and wherein using the values that are determined by performing time-averaging of the measurement results of the respective set of measurement results, x and y chromaticity coordinates in accordance with the CIE 1931 xy chromaticity diagram are determined for one of luminance, color-point and spectral distribution with an improved accuracy that is less than 0.002.

The person skilled in the art will appreciate that a deviation in spectral distribution results in a wavelength shift. This wavelength shift can be converted into x and y chromaticity coordinates in accordance with the CIE 1931 xy chromaticity diagram. As the x and y chromaticity coordinates for at least one of the above-mentioned optical characteristics of the activated display can be determined with an accuracy of less than 0.002, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Another aspect of the present invention is an optical measurement setup for performing a series of optical measurements on an activated display that has an optical characteristic with a performance that changes during and/or between the measurements of the series of optical measurements, wherein an improved accuracy is achieved for values for the optical characteristic that are determined based on measurement results for the optical characteristic that are obtained by performing the series of optical measurements, the optical measurement setup comprising:

a 2D imaging system that is configured and arranged to allow performing a series of optical 2D image measurements on the activated display;

a spot measurement system that is configured and arranged to allow performing a series of optical spot measurements on the activated display; and a processing unit comprising a memory unit that is provided with computer instructions, the processing unit being operatively connected with at least one of the 2D imaging system and the spot measurement system for receiving the measurement results for the optical characteristic of the activated display in the memory unit, wherein the computer instructions, when being executed on said measurement results, perform the steps of the method according to any one of the preceding claims to determine based on said measurement results, values for the optical characteristic with the improved accuracy.

In this way, the optical measurement setup according to the invention allows quick determination of x and y chromaticity coordinates for the optical characteristic of interest, e.g. luminance, color-point or spectral distribution, of the activated display with an accuracy of less than 0.002. Therefore, the optical measurement setup according to the invention enables that the impact of in-line optical testing, i.e. testing in a production line of the optical characteristics of activated displays that have already been mounted in actual display devices, on the throughput of the production line can be reduced. Consequently, the optical measurement setup according to the invention renders in-line optical testing a viable option.

The person skilled in the art will appreciate that the 2D imaging system and the spot measurement system can be stand-alone systems, but they can also be integrated into one combined system such as the ATLAS and Titan series offered by ADMESY.

In an embodiment of the optical measurement setup according to the invention, the 2D imaging system comprises a beam splitter that is configured and arranged to enable a spot measurement and a 2D image measurement to be performed simultaneously on the activated display.

In this way, the optical measurement setup according to the invention allows for an even more time-efficient determination of x and y chromaticity coordinates in accordance with the CIE 1931 xy chromaticity diagram for an optical characteristic of interest, e.g. at least one of luminance, color-point and spectral distribution, of the activated display with an accuracy of less than 0.002. As a result, the optical measurement setup according to the invention enables a further reduction of the impact of in-line optical testing on the throughput of the production line.

BRIEF DESCRIPTION OF THE DRAWINGS

Further features and advantages of the invention will become apparent from the description of the invention by way of exemplary and non-limiting embodiments of a configuration of a series of optical measurements in accordance with the method of the invention and exemplary and non-limiting embodiments of an optical measurement setup of the invention.

The person skilled in the art will appreciate that the described embodiments are exemplary in nature only and not to be construed as limiting the scope of protection in any way. The person skilled in the art will realize that alternatives and equivalent embodiments can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

Figure 1:
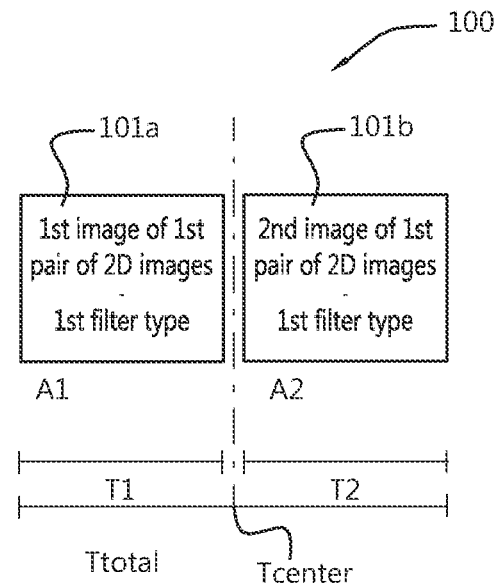
FIG. 1 shows a schematic representation of an exemplary, non-limiting first embodiment of a configuration of a series of optical measurements in accordance with the method of the present invention using a first pair of identical 2D image measurements to determine at least one of the luminance, color-point and spectral distribution of a first type of emitted light, for example red light, and the distributions of luminance and color-point over the entire light-emitting area of an activated display.

FIG. 1 shows a schematic representation of an exemplary, non-limiting first embodiment of a configuration of a series of optical measurements 100 in accordance with the method of the present invention using a first pair of identical 2D image measurements 101a, 101b to determine at least one of the luminance, color-point and spectral distribution of a first type of emitted light, for example red light, and the distributions of luminance and color-point over the entire light-emitting area of an activated display (not shown).

The 2D imaging system 301 in the context of the present invention comprises a camera 302 and a filter bank 303 that is provided with at least one optical filter. Configuring the 2D imaging system 302 to perform the first pair of identical 2D image measurements 101a, 101b comprises determining a total time interval $T_{total}$, during which the first pair of identical 2D image measurements 101a, 101b is performed. As shown in FIG. 1, the total time interval $T_{total}$ can be determined by adding up the respective time intervals $T_1$ and $T_2$ during which each respective 2D image measurement of the first pair of identical 2D image measurements is performed. FIG. 1 shows that the first time interval $T_1$ and the second time interval $T_2$ are non-overlapping and mirrored with respect to the center $T_{center}$ of the total time interval $T_{total}$.

The person skilled in the art will appreciate that the measurements of the first pair of 2D image measurements 101a, 101b are identical in the sense that they are performed in an identical way using the same first optical filter (not shown) of the first type. The first optical filter of the first type can be any suitable RGB filter or XYZ filter. The first 2D image measurement 101a of the first pair of identical 2D image measurements 101a, 101b can be performed using for example a red filter as first optical filter of a first type to obtain a first measurement result $A_1$ of the set of measurement results. In that case, the second 2D image measurement 101b of the first pair of identical 2D image measurements 101a, 101b is performed using the same red filter to obtain a second measurement result $A_2$ of the set of measurement results. The person skilled in the art will appreciate that the above-mentioned measurement sequence encompassing the first 2D image measurement 101a and the second 2D image measurement 101b of the first pair of identical 2D image measurements 101a, 101b can be performed for any given color, such as red, green, blue or any mixture of these colors.

By arranging the first time interval $T_1$ and the second time interval $T_2$ in the way shown in FIG. 1, time-averaging of the first measurement result $A_1$ and the second measurement result $A_2$ can be used to obtain an improved comparability of the first measurement result $A_1$ and the second measurement result $A_2$ of the set of measurement results obtained from the first pair of identical 2D image measurements 101a, 101b. As mentioned above, due to the time-averaging, influences on the first measurement result $A_1$ and the second measurement result $A_2$ that are caused by changes in the performance of the optical characteristic of interest occurring during and/or between the measurements of the first pair of identical 2D image measurements 101a, 101b can be reduced or ideally be eliminated. As a result of the improved comparability of the first measurement result $A_1$ and the second measurement result $A_2$ of the first pair of identical 2D image measurements 101a, 101b, the measurement accuracy with which the values for the optical characteristic of interest, e.g. luminance, color-point and spectral distribution, can be determined based on the first measurement result $A_1$ and the second measurement result $A_2$ can be improved. The method according to the invention allows determining x and y chromaticity coordinates in accordance with the CIE 1931 xy chromaticity diagram with an improved accuracy that is less than 0.002 using the values that have been determined based on the first measurement result $A_1$ and the second measurement result $A_2$. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 2:
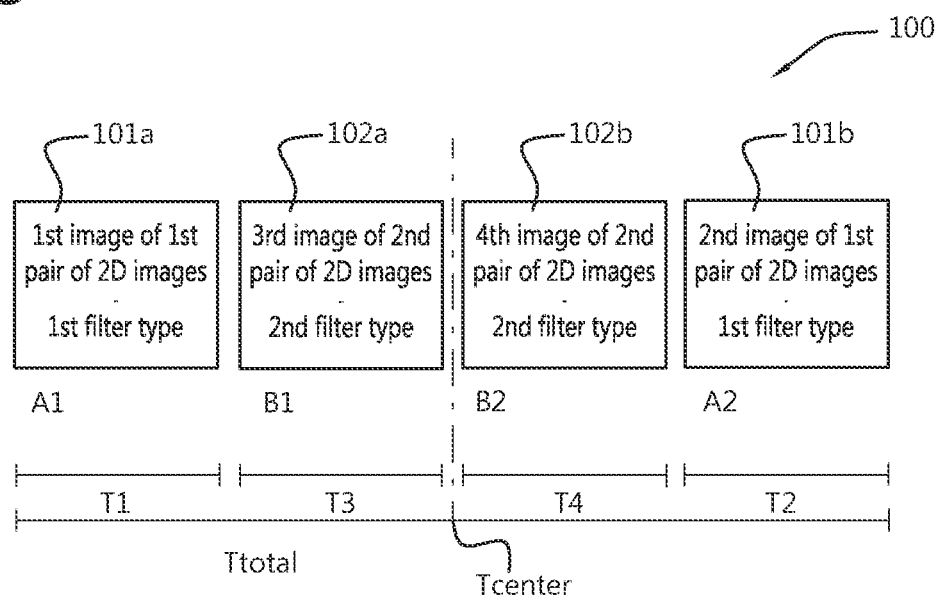
FIG. 2 shows a schematic representation of an exemplary, non-limiting second embodiment of a configuration of a series of optical measurements in accordance with the method of the present invention using in addition to the first pair of identical 2D image measurements as shown in FIG. 1, a second pair of identical 2D image measurements to determine at least one of the luminance, color-point and spectral distribution of a second type of emitted light, for example green light, and the distributions of luminance and color-point over the entire light-emitting area of the activated display.

FIG. 2 shows a schematic representation of an exemplary, non-limiting second embodiment of a configuration of a series of optical measurements 100 in accordance with the method of the present invention using in addition to the first pair of identical 2D image measurements 101a, 101b as shown in FIG. 1, a second pair of identical 2D image measurements 102a, 102b to determine at least one of the luminance, color-point and spectral distribution of a second type of emitted light, for example green light, and the distributions of luminance and color-point over the entire light-emitting area of the activated display (not shown).

The person skilled in the art will appreciate that the measurements of the second pair of 2D image measurements 102a, 102b are identical in the sense that they are performed in an identical way using the same second optical filter of the second type. It will be clear that the second optical filter of the second type can be any suitable RGB filter or XYZ filter that is different from the RGB filter or XYZ filter used as the first optical filter.

The third 2D image measurement 102a of the second pair of identical 2D image measurements 102a, 102b can be performed using for example a green filter as second optical filter of a second type to obtain a third measurement result $B_1$ of the set of measurement results. In that case, the fourth 2D image measurement 102b of the second pair of identical 2D image measurements 102a, 102b is performed using the same green filter to obtain a fourth measurement result $B_2$ of the set of measurement results. The person skilled in the art will appreciate that the above-mentioned measurement sequence encompassing the third 2D image measurement 102a and the fourth 2D image measurement 102b of the second pair of identical 2D image measurements 102a, 102b can be performed for any given color, such as red, green, blue or any mixture of these colors.

As shown in FIG. 2, the third time interval $T_3$ and the fourth time interval $T_4$ of the second pair of identical 2D image measurements 102a, 102b are non-overlapping neither with each other nor with the first time interval $T_1$ and the second time interval $T_2$ of the first pair of identical 2D image measurements 101a, 101b. Furthermore, the third time interval $T_3$ and the fourth time interval $T_4$ of the second pair of identical 2D image measurements 102a, 102b are also mirrored with respect to the center $T_{center}$ of the total time interval $T_{total}$.

By arranging the third time interval $T_3$ and the fourth time interval $T_4$ in the way shown in FIG. 2, time-averaging of the third measurement result $B_1$ and the fourth measurement result $B_2$ can be used to obtain an improved comparability of the third measurement result $B_1$ and the fourth measurement result $B_2$ of the set of measurement results obtained from the second pair of identical 2D image measurements 102a, 102b. As mentioned above, due to the time-averaging, influences on the third measurement result $B_1$ and the fourth measurement result $B_2$ that are caused by changes in the performance of the optical characteristic of interest occurring during and/or between the measurements of the second pair of identical 2D image measurements 102a, 102b can be reduced or ideally be eliminated. As a result of the improved comparability of the third measurement result $B_1$ and the fourth measurement result $B_2$ of the second pair of identical 2D image measurements 102a, 102b, the measurement accuracy with which the values for the optical characteristic of interest, e.g. luminance, color-point and spectral distribution, can be determined based on the third measurement result $B_1$ and the fourth measurement result $B_2$ can be improved. The method according to the invention allows determining x and y chromaticity coordinates in accordance with the CIE 1931 xy chromaticity diagram with an improved accuracy that is less than 0.002 using the values that have been determined based on the third measurement result $B_1$ and the fourth measurement result $B_2$. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 3:
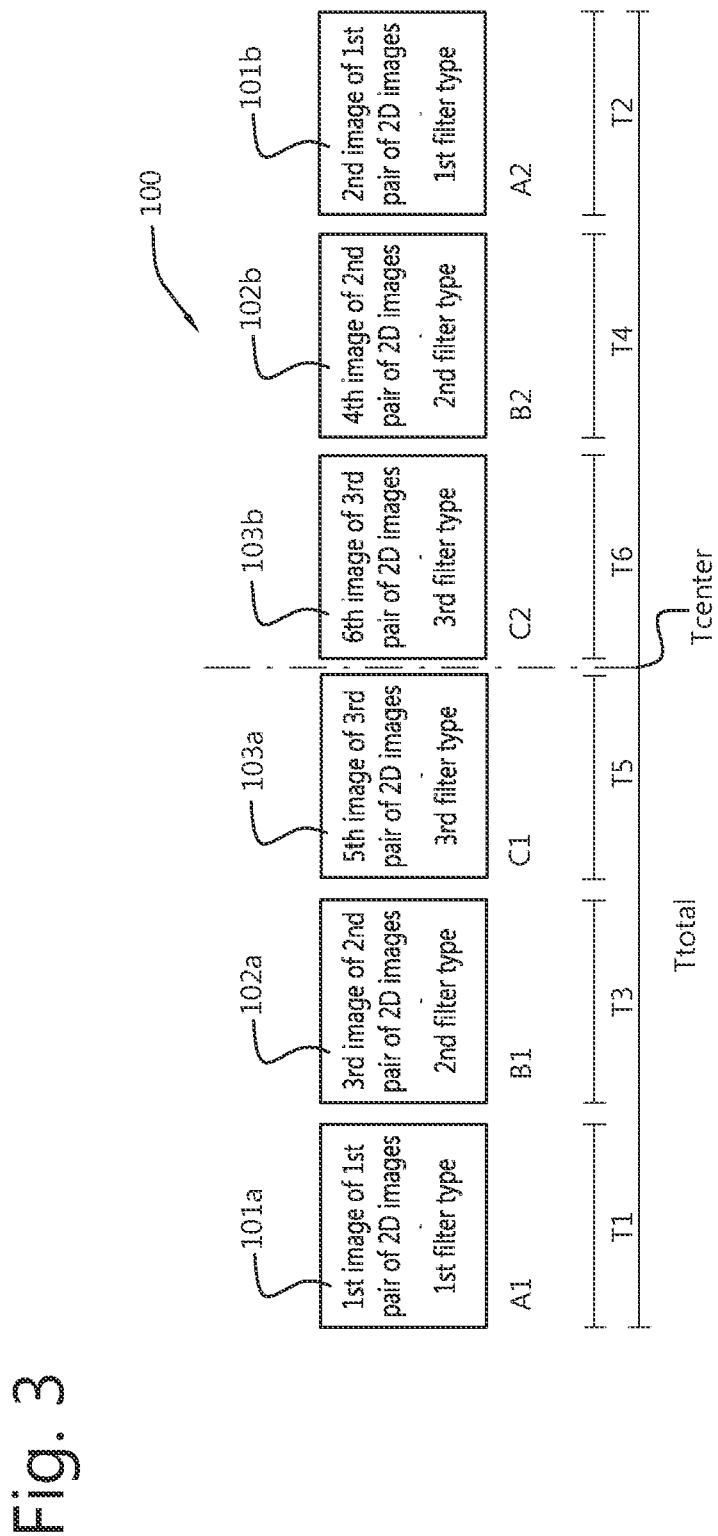
FIG. 3 shows a schematic representation of an exemplary, non-limiting third embodiment of a configuration of a series of optical measurements in accordance with the method of the present invention using in addition to the first pair of identical 2D image measurements as shown in FIG. 1 and the second pair of identical 2D image measurements as shown in FIG. 2, a third pair of identical 2D image measurements to determine at least one of the luminance, color-point and spectral distribution of a third type of emitted light, for example blue light, and the distributions of luminance and color-point over the entire light-emitting area of the activated display.

FIG. 3 shows a schematic representation of an exemplary, non-limiting third embodiment of a configuration of a series of optical measurements 100 in accordance with the method of the present invention using in addition to the first pair of identical 2D image measurements 101a, 101b as shown in FIG. 1 and the second pair of identical 2D image measurements 102a, 102b as shown in FIG. 2, a third pair of identical 2D image measurements 103a, 103b to determine at least one of the luminance, color-point and spectral distribution of a third type of emitted light, for example blue light, and the distributions of luminance and color-point over the entire light-emitting area of the activated display (not shown).

The person skilled in the art will appreciate that the measurements of the third pair of 2D image measurements 103a, 103b are identical in the sense that they are performed in an identical way using the same third optical filter of the third type. It will be clear that the third optical filter of the third type can be any suitable RGB filter or XYZ filter that is different from both the RGB filter or XYZ filter used as the first optical filter and the RGB filter or XYZ filter used as the second optical filter.

The fifth 2D image measurement 103a of the third pair of identical 2D image measurements 103a, 103b can be performed using for example a blue filter as a third optical filter of a third type to obtain a fifth measurement result $C_1$ of the set of measurement results. In that case, the sixth 2D image measurement 103b of the third pair of identical 2D image measurements 103a, 103b is performed using the same blue filter to obtain a sixth measurement result $C_2$ of the set of measurement results. The person skilled in the art will appreciate that the above-mentioned measurement sequence encompassing the fifth 2D image measurement 103a and the sixth 2D image measurement 103b of the third pair of identical 2D image measurements 103a, 103b can be performed for any given color, such as red, green, blue or any mixture of these colors.

As shown in FIG. 3, the fifth time interval $T_5$ and the sixth time interval $T_6$ of the third pair of identical 2D image measurements 103a, 103b are non-overlapping neither with each other nor with the first time interval $T_1$ and the second time interval $T_2$ of the first pair of identical 2D image measurements 101a, 101b and the third time interval $T_3$ and the fourth time interval $T_4$ of the second pair of identical 2D image measurements 102a, 102b. Furthermore, the fifth time interval $T_5$ and the sixth time interval $T_6$ of the third pair of identical 2D image measurements 103a, 103b are also mirrored with respect to the center $T_{center}$ of the total time interval $T_{total}$.

By arranging the fifth time interval $T_5$ and the sixth time interval $T_6$ in the way shown in FIG. 3, time-averaging of the fifth measurement result $C_1$ and the sixth measurement result $C_2$ can be used to obtain an improved comparability of the fifth measurement result $C_1$ and the sixth measurement result $C_2$ of the set of measurement results obtained from the third pair of identical 2D image measurements 103a, 103b. As mentioned above, due to the time-averaging, influences on the fifth measurement result $C_1$ and the sixth measurement result $C_2$, which are obtained by the third pair of identical 2D image measurements 103a, 103b that are caused by changes in the performance of the optical characteristic of interest occurring during and/or between the measurements of the third pair of identical 2D image measurements 103a, 103b can be reduced or ideally be eliminated. As a result of the improved comparability of the measurement results of the third pair of identical 2D image measurements 103a, 103b, the measurement accuracy with which the values for the optical characteristic of interest, e.g. luminance, color-point and spectral distribution, can be determined based on the fifth measurement result $C_1$ and the sixth measurement result $C_2$ can be improved. The method according to the invention allows determining x and y chromaticity coordinates in accordance with the CIE 1931 xy chromaticity diagram with an improved accuracy that is less than 0.002 using the values that have been determined based on the fifth measurement result $C_1$ and the sixth measurement result $C_2$. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 4:
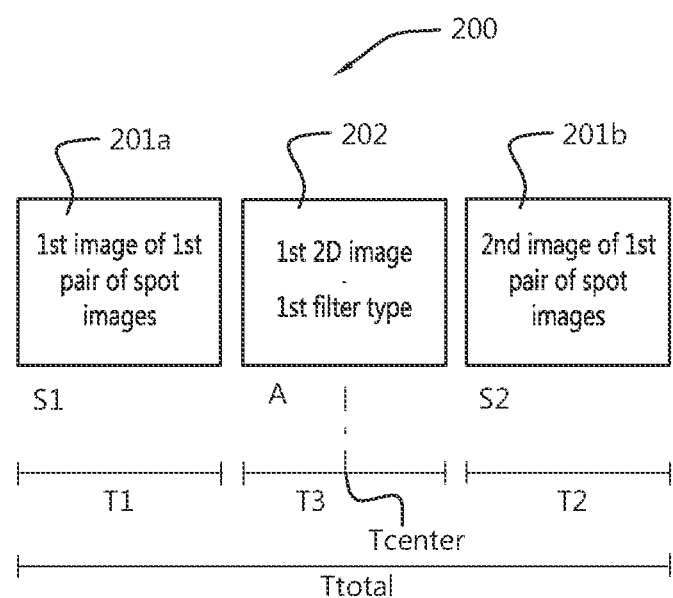
FIG. 4 shows a schematic representation of an exemplary, non-limiting fourth embodiment of a configuration of a series of optical measurements in accordance with the method of the present invention using a first pair of identical spot measurements and a first 2D image measurement to determine at least one of the luminance, color-point and spectral distribution of a first type of emitted light, for example red light, and the distributions of luminance and color-point over the entire light-emitting area of the activated display.

FIG. 4 shows a schematic representation of an exemplary, non-limiting fourth embodiment of a configuration of a series of optical measurements 200 in accordance with the method of the present invention using a first pair of identical spot measurements 201a, 201b and a first 2D image measurement 202 to determine at least one of the luminance, color-point and spectral distribution of a first type of emitted light, for example red light, and the distributions of luminance and color-point over the entire light-emitting area of the activated display (not shown). The person skilled in the art will appreciate that the measurements of the first pair of spot measurements 201a, 201b are identical in the sense that they are performed using identical settings.

The first spot measurement 201a of the first pair of identical spot measurements 201a, 201b is performed during a first time interval $T_1$ to obtain a first measurement result $S_1$ of the set of measurement results. The second spot measurement 201b of the first pair of identical spot measurements 201a, 201b is performed during a second time interval $T_2$ to obtain a second measurement result $S_2$ of the set of measurement results. Furthermore, the first 2D image measurement 202 is performed during a third time interval $T_3$ using for example a red filter as a first optical filter of a first type to obtain a third measurement result A of the set of measurement results.

The person skilled in the art will appreciate that the above-mentioned first sequence of spot-2D-spot measurements can be performed for any given color, such as red, green, blue or any mixture of these colors. In the case of using a red filter for the first 2D image measurement 202, a test image (not shown) can be displayed on the activated display (not shown) to render the entire light-emitting area of the activated display to emit red light. The first sequence of spot-2D-spot measurements can then be performed to determine for example at least one of the luminance, color-point and spectral distribution of the emitted red light and the distributions of luminance and color-point over the entire light-emitting area of the activated display. The person skilled in the art will appreciate that any suitable test image comprising any color and/or pattern can be used.

As shown in FIG. 4, the first time interval $T_1$, the second time interval $T_2$ and the third time interval $T_3$ are non-overlapping. In addition, the first time interval $T_1$ and the second time interval $T_2$ are mirrored with respect to the center $T_{center}$ of the third time interval $T_3$.

By arranging the first time interval T1, the second time interval T2 and the third time interval $T_3$ in the way shown in FIG. 4, an improved comparability of the first measurement result $S_1$ and the second measurement result $S_2$ of the set of measurement results can be achieved by the above-mentioned time-averaging of the first measurement result $S_1$ and the second measurement result $S_2$. Due to the time-averaging, influences on the first measurement result $S_1$ and the second measurement result $S_2$ that are caused by changes in the performance of the optical characteristic of interest occurring during and/or between the measurements of the first pair of identical spot measurements 201a, 201b can be reduced or ideally be eliminated. As a result of the improved comparability of the measurement results $S_1$ and $S_2$ of the first pair of identical spot measurements 201a, 201b, the measurement accuracy with which the values for the optical characteristic of interest, e.g. luminance, color-point and spectral distribution, can be determined based on the first measurement result $S_1$ and the second measurement result $S_2$ can be improved.

In addition, due to the above-mentioned time-averaging, the first measurement result $S_1$ and the second measurement result $S_2$ of the set of measurement results have virtually been obtained at a time that coincides with the center $T_{center}$ of the third time interval $T_3$ during which the first 2D image measurement 202 was performed to obtain the third measurement result A of the set of measurement results. Hence, the comparability of the first measurement result $S_1$, the second measurement result $S_2$ and the third measurement result A of the set of measurement results has been improved. As a result of the fact that the first measurement result $S_1$, the second measurement result $S_2$ and the third measurement result A of the set of measurement results have been obtained virtually simultaneously and therefore are hardly and ideally not affected by changes in the performance of the optical characteristic of interest that occur during and/or between the measurements of the first pair of identical spot measurements 201a, 201b and the first 2D image measurement 202 on the activated display (not shown), the measurement accuracy with which the values for the optical characteristic of interest can be determined based on the first measurement result $S_1$, the second measurement result $S_2$ and the third measurement result A of the set of measurement results has been improved. Hence, the method according to the invention enables accurate determination of values for the optical characteristics of the activated display.

Furthermore, the method according to the invention allows determining x and y chromaticity coordinates in accordance with the CIE 1931 xy chromaticity diagram with an improved accuracy that is less than 0.002 using the values that have been determined based on the first measurement result $S_1$, the second measurement result $S_2$ and the third measurement result A. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 5:
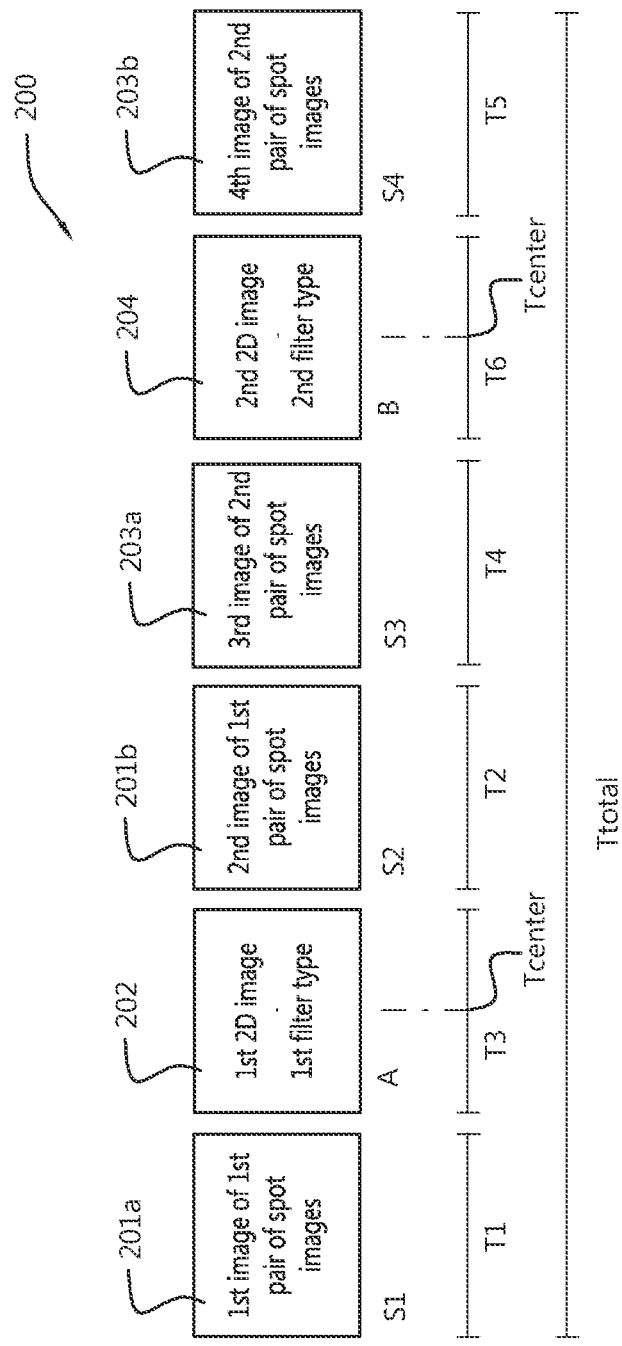
FIG. 5 shows a schematic representation of an exemplary, non-limiting fifth embodiment of a configuration of a series of optical measurements in accordance with the method of the present invention using in addition to the first pair of identical spot measurements and the first 2D image measurement as shown in FIG. 4, a second pair of identical spot measurements and a second 2D image measurement to determine at least one of the luminance, color-point and spectral distribution of a second type of emitted light, for example green light, and the distributions of luminance and color-point over the entire light-emitting area of the activated display.

FIG. 5 shows a schematic representation of an exemplary, non-limiting fifth embodiment of a configuration of a series of optical measurements 200 in accordance with the method of the present invention using in addition to the first pair of identical spot measurements 201a, 201b and the first 2D image measurement 202 as shown in FIG. 4, a second pair of identical spot measurements 203a, 203b and a second 2D image measurement 204 to determine at least one of the luminance, color-point and spectral distribution of a second type of emitted light, for example green light, and the distributions of luminance and color-point over the entire light-emitting area of the activated display (not shown). The person skilled in the art will appreciate that the measurements of the second pair of spot measurements 203a, 203b are identical in the sense that they are performed using identical settings.

The third spot measurement 203a of the second pair of identical spot measurements 203a, 203b is performed during a fourth time interval $T_4$ to obtain a fourth measurement result $S_3$ of the set of measurement results. The fourth spot measurement 203b of the second pair of identical spot measurements 203a, 203b is performed during a fifth time interval $T_5$ to obtain a fifth measurement result $S_4$ of the set of measurement results. Furthermore, the second 2D image measurement 204 is performed during a sixth time interval $T_6$ using for example a green filter as a second optical filter of a second type to obtain a sixth measurement result B of the set of measurement results.

The person skilled in the art will appreciate that the above-mentioned second sequence of spot-2D-spot measurements can be performed for any given color, such as red, green, blue or any mixture of these colors. In the case of using a green filter for the second 2D image measurement 204, a test image (not shown) can be displayed on the activated display (not shown) to render the entire light-emitting area of the activated display to emit green light. The second sequence of spot-2D-spot measurements can then be performed to determine for example at least one of the luminance, color-point and spectral distribution of the emitted green light and the distributions of luminance and color-point over the entire light-emitting area of the activated display. The person skilled in the art will appreciate that any suitable test image comprising any color and/or pattern can be used.

As shown in FIG. 5, the fourth time interval $T_4$, the fifth time interval $T_5$ and the sixth time interval $T_6$ of the second pair of identical spot measurements 203a, 203b and said second 2D image measurement 204, respectively are non-overlapping neither with each other nor with the first time interval $T_1$, the second time interval $T_2$ and the third time interval $T_3$ of the first pair of identical spot measurements 201a, 201b and the first 2D image measurement 202, respectively. Furthermore, the fourth time interval $T_4$ and the fifth time interval $T_5$ are mirrored with respect to the center $T_{center}$ of the sixth time interval $T_6$.

By arranging the fourth time interval $T_4$, the fifth time interval $T_5$ and the sixth time interval $T_6$ in the way shown in FIG. 5, an improved comparability of the fourth measurement result $S_3$ and the fifth measurement result $S_4$ of the set of measurement results can be achieved by the above-mentioned time-averaging of the fourth measurement result $S_3$ and the fifth measurement result $S_4$. Due to the time-averaging, influences on the fourth measurement result $S_3$ and the fifth measurement result $S_4$ that are caused by changes in the performance of the optical characteristic of interest occurring during and/or between the measurements of the second pair of identical spot measurements 203a, 203b can be reduced or ideally be eliminated. As a result of the improved comparability of the measurement results of the second pair of identical spot measurements 203a, 203b, the measurement accuracy with which the values for the optical characteristic of interest, e.g. luminance, color-point and spectral distribution, can be determined based on the fourth measurement result $S_3$ and the fifth measurement result $S_4$ can be improved.

In addition, due to the above-mentioned time-averaging, the fourth measurement result $S_3$ and the fifth measurement result $S_4$ of the set of measurement results have virtually been obtained at a time that coincides with the center $T_{center}$ of the sixth time interval $T_6$ during which the second 2D image measurement was performed to obtain the sixth measurement result B of the set of measurement results. Hence, the comparability of the fourth measurement result $S_3$, the fifth measurement result $S_4$ and the sixth measurement result B of the set of measurement results has been improved. As a result of the fact that the fourth measurement result $S_3$, the fifth measurement result 84 and the sixth measurement result B of the set of measurement results have been obtained virtually simultaneously and therefore are hardly and ideally not affected by changes in the performance of the optical characteristic of interest that occur during and/or between the measurements of the second pair of identical spot measurements 203a, 203b and the second 2D image measurement 204 on the activated display (not shown), the measurement accuracy with which the values for the optical characteristic of interest can be determined based on the fourth measurement result $S_3$, the fifth measurement result $S_4$ and the sixth measurement result B of the set of measurement results has been improved. Hence, the method according to the invention enables accurate determination of values for the optical characteristics of the activated display.

Furthermore, the method according to the invention allows determining x and y chromaticity coordinates in accordance with the CIE 1931 xy chromaticity diagram with an improved accuracy that is less than 0.002 using the values that have been determined based on the fourth measurement result $S_3$, the fifth measurement result $S_4$ and the sixth measurement result B. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 6:
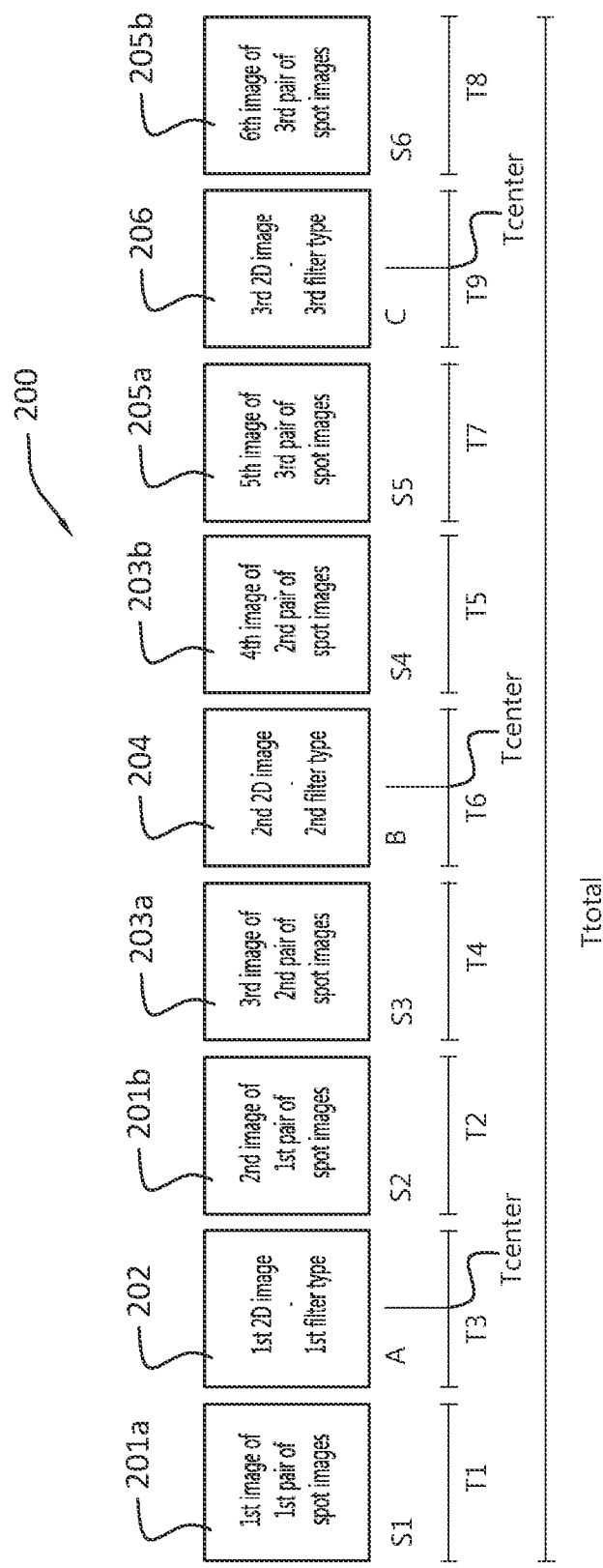
FIG. 6 shows a schematic representation of an exemplary, non-limiting sixth embodiment of a configuration of a series of optical measurements in accordance with the method of the present invention using in addition to the first pair of identical spot measurements and the first 2D image measurement as shown in FIG. 4, the second pair of identical spot measurements and the second 2D image measurement as shown in FIG. 5, a third pair of identical spot measurements and a third 2D image measurement to determine at least one of the luminance, color-point and spectral distribution of a third type of emitted light, for example blue light, and the distributions of luminance and color-point over the entire light-emitting area of the activated display.

FIG. 6 shows a schematic representation of an exemplary, non-limiting sixth embodiment of a configuration of a series of optical measurements 200 in accordance with the method of the present invention using in addition to the first pair of identical spot measurements 201a, 201b and the first 2D image measurement 202 as shown in FIG. 4, the second pair of identical spot measurements 203a, 203b and the second 2D image measurement 204 as shown in FIG. 5, a third pair of identical spot measurements 205a, 205b and a third 2D image measurement 206 to determine at least one of the luminance, color-point and spectral distribution of a third type of emitted light, for example blue light, and the distributions of luminance and color-point over the entire light-emitting area of the activated display (not shown). The person skilled in the art will appreciate that the measurements of the third pair of spot measurements 205a, 205b are identical in the sense that they are performed using identical settings.

The fifth spot measurement 205a of the third pair of identical spot measurements 205a, 205b is performed during a seventh time interval $T_1$ to obtain a seventh measurement result $S_5$ of the set of measurement results. The sixth spot measurement 205b of the third pair of identical spot measurements 205a, 205b is performed during an eighth time interval $T_8$ to obtain an eighth measurement result $S_6$ of the set of measurement results. Furthermore, the third 2D image measurement 206 is performed during a ninth time interval $T_9$ using for example a blue filter as a third optical filter of a third type to obtain a ninth measurement result C of the set of measurement results.

The person skilled in the art will appreciate that the above-mentioned third sequence of spot-2D-spot measurements can be performed for any given color, such as red, green, blue or any mixture of these colors. In the case of using a blue filter for the third 2D image measurement 206, a test image (not shown) can be displayed on the activated display (not shown) to render the entire light-emitting area of the activated display to emit blue light. The third sequence of spot-2D-spot measurements can then be performed to determine for example at least one of the luminance, color-point and spectral distribution of the emitted blue light and the distributions of luminance and color-point over the entire light-emitting area of the activated display. The person skilled in the art will appreciate that any suitable test image comprising any color and/or pattern can be used.

As shown in FIG. 6, the seventh time interval $T_7$, the eighth time interval $T_8$ and the ninth time interval $T_9$ of the third pair of identical spot measurements 205a, 205b and the third 2D image measurement 206, respectively are non-overlapping neither with each other nor with any one of the first time interval $T_1$, the second time interval $T_2$ and the third time interval $T_3$ of the first pair of identical spot measurements 201a, 201b and the first 2D image measurement 202, respectively, and the fourth time interval $T_4$, the fifth time interval $T_5$ and the sixth time interval $T_6$ of the second pair of identical spot measurements 203a, 203b and the second 2D image measurement 204, respectively. Furthermore, the seventh time interval $T_7$ and the eighth time interval $T_8$ are mirrored with respect to the center $T_{center}$ of the ninth time interval $T_9$.

By arranging the seventh time interval $T_7$, the eighth time interval $T_8$ and the ninth time interval $T_9$ in the way shown in FIG. 6, an improved comparability of the seventh measurement result $S_5$ and the eighth measurement result $S_6$ of the set of measurement results can be achieved by the above-mentioned time-averaging of the seventh measurement result $S_5$ and the eighth measurement result $S_6$. Due to the time-averaging, influences on the seventh measurement result $S_5$ and the eighth measurement result $S_6$, which are obtained by the third pair of identical spot measurements 205a, 205b that are caused by changes in the performance of the optical characteristic of interest occurring during and/or between the measurements of the third pair of identical spot measurements 205a, 205b can be reduced or ideally be eliminated. As a result of the improved comparability of the measurement results $S_5$ and $S_6$ of the third pair of identical spot measurements 205a, 205b, the measurement accuracy with which the values for the optical characteristic of interest, e.g. luminance, color-point and spectral distribution, can be determined based on the seventh measurement result $S_5$ and the eighth measurement result $S_6$ can be improved.

In addition, due to the above-mentioned time-averaging, the seventh measurement result $S_5$ and the eighth measurement result $S_6$ of the set of measurement results have virtually been obtained at a time that coincides with the center $T_{center}$ of the ninth time interval $T_9$ during which the third 2D image measurement 206 was performed to obtain the ninth measurement result C of the set of measurement results. Hence, the comparability of the seventh measurement result $S_5$, the eighth measurement result $S_6$ and the ninth measurement result C of the set of measurement results has been improved. As a result of the fact that the seventh measurement result $S_5$, the eighth measurement result $S_6$ and the ninth measurement result C of the set of measurement results have been obtained virtually simultaneously and therefore are hardly and ideally not affected by changes in the performance of the optical characteristic of interest that occur during and/or between the measurements of the third pair of identical spot measurements 205a, 205b and the third 2D image measurement 206 on the activated display (not shown), the measurement accuracy with which the values for the optical characteristic of interest can be determined based on the seventh measurement result $S_5$, the eighth measurement result $S_6$ and the ninth measurement result C of the set of measurement results has been improved. Hence, the method according to the invention enables accurate determination of values for the optical characteristics of the activated display.

Furthermore, the method according to the invention allows determining x and y chromaticity coordinates in accordance with the CIE 1931 xy chromaticity diagram with an improved accuracy that is less than 0.002 using the values that have been determined based on the seventh measurement result $S_5$, the eighth measurement result $S_6$ and the ninth measurement result C. In this way, the method according to the invention enables detection of deviations in at least one of luminance, color-point and spectral distribution of an activated display that are invisible for the human eye as the human eye has a sensitivity threshold for deviations in any one of the above-mentioned optical characteristics of 0.002.

Figure 7:
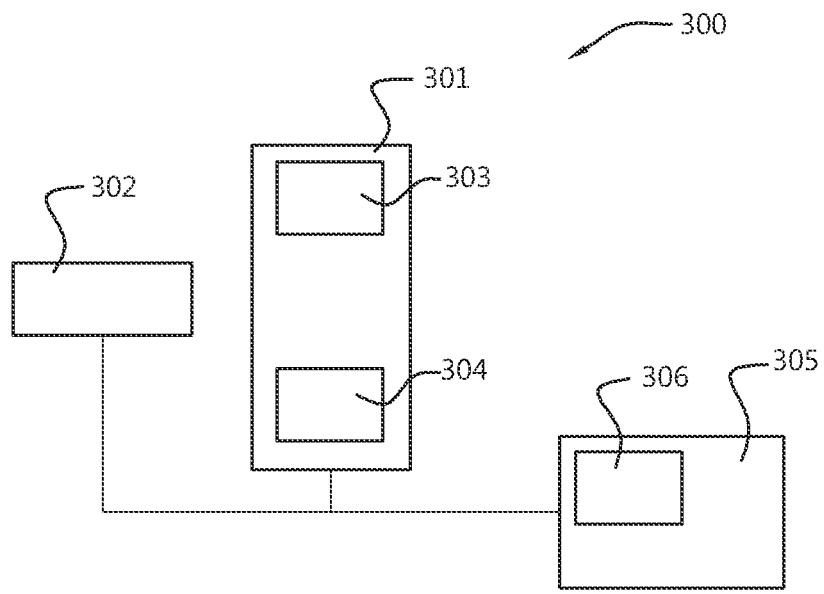
FIG. 7 shows a schematic top view representation of an exemplary, non-limiting first embodiment of an optical measurement setup according to the invention.

FIG. 7 shows a schematic top view representation of an exemplary, non-limiting first embodiment of an optical measurement setup 300 according to the invention. In accordance with the first embodiment, the optical measurement setup 300 comprises a 2D imaging system 301 that is configured and arranged to allow performing the series of optical measurements on an activated display (not shown) and a spot measurement system 302 that is configured and arranged to allow performing the series of optical spot measurements on the activated display. The 2D imaging system 301 comprises a camera 304 and a filter bank 303 that is provided with at least one optical filter, for example at least one of a red, green and blue filter.

Furthermore, the optical measurement setup 300 comprises a processing unit 305 comprising a memory unit 306 that is provided with computer instructions. The processing unit 305 being operatively connected with the 2D imaging system 301 and the spot measurement system 302 for receiving the respective measurement results for the optical characteristic of the activated display in the memory unit 306. The computer instructions, when being executed on the received measurement results, perform the steps of the method according to the present invention to determine based on the received measurement results, values for the optical characteristic with an improved accuracy.

The optical measurement setup 300 according to the invention allows quick determination of x and y chromaticity coordinates in accordance with the CIE 1931 xy chromaticity diagram for the optical characteristic of interest, e.g. luminance, color-point or spectral distribution, of the activated display with an accuracy of less than 0.002. Therefore, the optical measurement setup 300 according to the invention enables that the impact of in-line optical testing, i.e. testing in a production line of the optical characteristics of activated displays that have already been mounted in actual display devices, on the throughput of the production line can be reduced. Consequently, the optical measurement setup 300 according to the invention renders in-line optical testing a viable option.

The person skilled in the art will appreciate that the 2D imaging system 301 and the spot measurement system 302 can be stand-alone systems. However, they can also be integrated into one combined system such as system of the ATLAS and Titan series offered by ADMESY.

Figure 8:
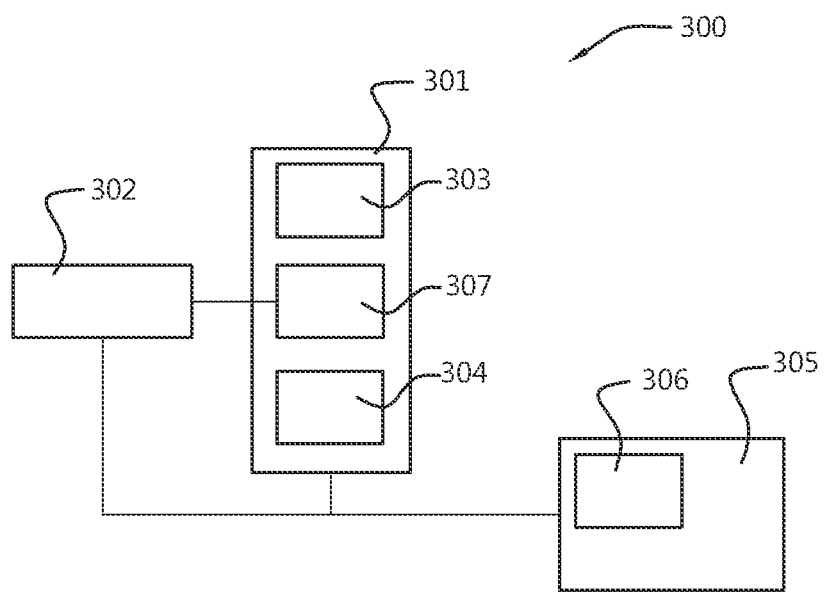
FIG. 8 shows a schematic top view representation of an exemplary, non-limiting second embodiment of an optical measurement setup according to the invention.

FIG. 8 shows a schematic top view representation of an exemplary, non-limiting second embodiment of an optical measurement setup 300 according to the invention. The 2D imaging system 301 comprises a beam splitter 307 that is configured and arranged to enable a spot measurement and a 2D image measurement to be performed simultaneously on the activated display. In this way, the optical measurement setup 300 according to the invention allows for an even more time-efficient determination of x and y chromaticity coordinates in accordance with the CIE 1931 xy chromaticity diagram for an optical characteristic of interest, e.g. at least one of luminance, color-point and spectral distribution, of the activated display with an accuracy of less than 0.002. As a result, the optical measurement setup 300 according to the invention enables a further reduction of the impact of in-line optical testing on the throughput of the production line.

The present invention can be summarized as relating to a method for performing a series of optical measurements 100 on an activated display, whether or not it has already been mounted in an actual display device, the activated display having an optical characteristic with a performance that changes during and/or between the measurements of the series of optical measurements that are configured as a sequence of measurements comprising a pair of identical 2D image measurements or a pair of identical spot measurements in combination with a 2D image measurement to determine at least one of luminance, color-point and spectral distribution of emitted light, and the distributions of luminance and color-point over the entire light-emitting area of the activated display with an improved accuracy. The invention also relates to an optical measurement setup 300 for performing the series of optical measurements 100 in accordance with the method of the invention.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 100 series of optical measurements only comprising 2D image measurements
101a first 2D image measurement of first pair of identical 2D image measurements
101b second 2D image measurement of first pair of identical 2D image measurements
102a third 2D image measurement of second pair of identical 2D image measurements
102b fourth 2D image measurement of second pair of identical 2D image measurements
103a fifth 2D image measurement of third pair of identical 2D image measurements
103b sixth 2D image measurement of third pair of identical 2D image measurements
200 series of optical measurements comprising 2D image measurements and spot measurements
201a first spot measurement of first pair of identical spot measurements
201b second spot measurement of first pair of identical spot measurements
202 first 2D image measurement
203a third 2D image measurement of second pair of identical 2D image measurements
203b fourth 2D image measurement of second pair of identical 2D image measurements
204 second 2D image measurement
205a fifth 2D image measurement of third pair of identical 2D image measurements
205b sixth 2D image measurement of third pair of identical 2D image measurements
206 third 2D image measurement
$A_1$ first measurement result of first 2D image measurement of first pair of identical 2D image measurements
$A_2$ second measurement result of second 2D image measurement of first pair of identical 2D image measurements
$B_1$ third measurement result of third 2D image measurement of second pair of identical 2D image measurements
$B_2$ fourth measurement result of fourth 2D image measurement of second pair of identical 2D image measurements
$C_1$ third measurement result of third 2D image measurement of second pair of identical 2D image measurements
$C_2$ fourth measurement result of fourth 2D image measurement of second pair of identical 2D image measurements
$S_1$ first measurement result of first spot measurement of first pair of identical spot measurements
$S_2$ second measurement result of second spot measurement of first pair of identical spot measurements
A third measurement result of first 2D image measurement of first sequence of spot-2D-spot measurements
$S_3$ fourth measurement result of third spot measurement of second pair of identical spot measurements
$S_4$ fifth measurement result of fourth spot measurement of second pair of identical spot measurements
B sixth measurement result of second 2D image measurement of second sequence of spot-2D-spot measurements
$S_5$ seventh measurement result of fifth spot measurement of third pair of identical spot measurements
$S_6$ eighth measurement result of sixth spot measurement of third pair of identical spot measurements
C ninth measurement result of third 2D image measurement of third sequence of spot-2D-spot measurements
$T_1$ first time interval
$T_2$ second time interval
$T_3$ third time interval
$T_4$ fourth time interval
$T_5$ fifth time interval
$T_6$ sixth time interval
$T_7$ seventh time interval
$T_8$ eighth time interval $T_9$ ninth time interval
$T_{center}$ center of time interval
$T_{total}$ total time interval
300 optical measurement setup
301 2D imaging system
302 spot measurement system
303 filter bank
304 camera
305 processing unit
306 memory unit
307 beam splitter

What is claimed is:

1. A method for performing a series of optical measurements with a 2D imaging system on an activated display that has an optical characteristic with a performance that changes during and/or between the measurements of the series of optical measurements, wherein an improved comparability is achieved for values for the optical characteristic that are determined based on measurement results for the optical characteristic that are obtained by performing the series of optical measurements, the method comprising the steps of:

configuring the 2D imaging system to perform each optical measurement of the series of optical measurements as a sequence of measurements to obtain for each optical measurement a respective set of measurement results for the optical characteristic; and determining for each optical measurement of the series of optical measurements a respective value for the optical characteristic by performing time-averaging of the measurement results of the respective set of measurement results of the respective optical measurement, wherein configuring the 2D imaging system to perform each optical measurement of the series of optical measurements as a sequence of measurements to obtain for each optical measurement a respective set of measurement results for the optical characteristic comprises:

determining a total time interval during which the series of optical measurements is performed by adding up the respective time intervals during which each respective optical measurement of the series of optical measurements is performed; and configuring the sequence of measurements to comprise at least one pair of identical 2D image measurements, wherein a first 2D image measurement of a first pair of identical 2D image measurements is performed during a first time interval using a first optical filter of a first type to obtain a first measurement result of the set of measurement results, and a second 2D image measurement of the first pair of identical 2D image measurements is performed during a second time interval using said first optical filter of the first type to obtain a second measurement result of the set of measurement results, wherein the first time interval and the second time interval are non-overlapping and mirrored with respect to the center of the total time interval, wherein the sequence of measurements is configured to comprise a second pair of identical 2D image measurements, wherein a third 2D image measurement of the second pair of identical 2D image measurements is performed during a third time interval using a second optical filter of a second type to obtain a third measurement result of the set of measurement results, and a fourth 2D image measurement of the second pair of identical 2D image measurements is performed during a fourth time interval using said second optical filter of the second type to obtain a fourth measurement result of the set of measurement results, wherein the third time interval and the fourth time interval of the second pair of identical 2D image measurements are non-overlapping neither with each other nor with the first time interval and the second time interval of the first pair of identical 2D image measurements, and wherein the third time interval and the fourth time interval of the second pair of identical 2D image measurements are also mirrored with respect to the center of the total time interval.

2. The method according to claim 1, wherein the sequence of measurements is configured to comprise a third pair of identical 2D image measurements, wherein a fifth 2D image measurement of the third pair of identical 2D image measurements is performed during a fifth time interval using a third optical filter of a third type to obtain a fifth measurement result of the set of measurement results, and a sixth 2D image measurement of the third pair of identical 2D image measurements is performed during a sixth time interval using said third optical filter of the third type to obtain a sixth measurement result of the set of measurement results, wherein the fifth time interval and the sixth time interval of the third pair of identical 2D image measurements are non-overlapping neither with each other nor with the first time interval and the second time interval of the first pair of identical 2D image measurements and the third time interval and the fourth time interval of the second pair of identical 2D image measurements, and wherein the fifth time interval and the sixth time interval of the third pair of identical 2D image measurements are also mirrored with respect to the center of the total time interval.

3. The method according to claim 1, wherein the optical characteristic of the activated optical display is one of luminance, color-point and spectral distribution, and wherein using the values that are determined by performing time-averaging of the measurement results of the respective set of measurement results, x and y chromaticity coordinates in accordance with the CIE 1931 xy chromaticity diagram are determined for one of luminance, color-point and spectral distribution with an improved accuracy that is less than 0.002.

4. A method for performing a series of optical measurements with a 2D imaging system on an activated display that has an optical characteristic with a performance that changes during and/or between the measurements of the series of optical measurements, wherein an improved comparability is achieved for values for the optical characteristic that are determined based on measurement results for the optical characteristic that are obtained by performing the series of optical measurements, the method comprising the steps of:

configuring the 2D imaging system to perform each optical measurement of the series of optical measurements as a sequence of measurements to obtain for each optical measurement a respective set of measurement results for the optical characteristic; and determining for each optical measurement of the series of optical measurements a respective value for the optical characteristic by performing time-averaging of the measurement results of the respective set of measurement results of the respective optical measurement, wherein configuring the 2D imaging system to perform each optical measurement of the series of optical measurements as a sequence of measurements to obtain for each optical measurement a respective set of measurement results for the optical characteristic comprises:

configuring the sequence of measurements to comprise at least one pair of identical spot measurements and a first 2D image measurement, wherein a first spot measurement of a first pair of identical spot measurements is performed during a first time interval to obtain a first measurement result of the set of measurement results, a second spot measurement of the first pair of identical spot measurements is performed during a second time interval to obtain a second measurement result of the set of measurement results, and the first 2D image measurement is performed during a third time interval using a first optical filter of a first type to obtain a third measurement result of the set of measurement results, wherein the first time interval, the second time interval and the third time interval are non-overlapping and wherein the first time interval and the second time interval are mirrored with respect to the center of the third time interval, wherein the sequence of measurements is configured to comprise a second pair of identical spot measurements and a second 2D image measurement, wherein a third spot measurement of the second pair of identical spot measurements is performed during a fourth time interval to obtain a fourth measurement result of the set of measurement results, a fourth spot measurement of the second pair of identical spot measurements is performed during a fifth time interval to obtain a fifth measurement result of the set of measurement results, and said second 2D image measurement is performed during a sixth time interval using a second optical filter of a second type to obtain a sixth measurement result of the set of measurement results, wherein the fourth time interval, the fifth time interval and the sixth time interval of the second pair of identical spot measurements and said second 2D image measurement, respectively are non-overlapping neither with each other nor with the first time interval, the second time interval and the third time interval of the first pair of identical spot measurements and said first 2D image measurement, respectively, and wherein the fourth time interval and the fifth time interval are mirrored with respect to the center of the sixth time interval.

5. The method according to claim 3, wherein the sequence of measurements is configured to comprise a third pair of identical spot measurements and a third 2D image measurement, wherein a fifth spot measurement of the third pair of identical spot measurements is performed during a seventh time interval to obtain a seventh measurement result of the set of measurement results, a sixth spot measurement of the third pair of identical spot measurements is performed during an eighth time interval to obtain an eighth measurement result of the set of measurement results, and said third 2D image measurement is performed during a ninth time interval using a third optical filter of a third type to obtain a ninth measurement result of the set of measurement results, wherein the seventh time interval, the eighth time interval and the ninth time interval of the third pair of identical spot measurements and said third 2D image measurement, respectively are non-overlapping neither with each other nor with any one of the first time interval, the second time interval and the third time interval of the first pair of identical spot measurements and said first 2D image measurement, respectively, and the fourth time interval, the fifth time interval and the sixth time interval of the second pair of identical spot measurements and said second 2D image measurement, respectively, and wherein the seventh time interval and the eighth time interval are mirrored with respect to the center of the ninth time interval.

6. The method according to claim 4, wherein the optical characteristic of the activated optical display is one of luminance, color-point and spectral distribution, and wherein using the values that are determined by performing time-averaging of the measurement results of the respective set of measurement results, x and y chromaticity coordinates in accordance with the CIE 1931 xy chromaticity diagram are determined for one of luminance, color-point and spectral distribution with an improved accuracy that is less than 0.002.

7. An optical measurement setup for performing a series of optical measurements on an activated display that has an optical characteristic with a performance that changes during and/or between the measurements of the series of optical measurements, wherein an improved accuracy is achieved for values for the optical characteristic that are determined based on measurement results for the optical characteristic that are obtained by performing the series of optical measurements, the optical measurement setup comprising:

a 2D imaging system that is configured and arranged to allow performing a series of optical 2D image measurements on the activated display;

a spot measurement system that is configured and arranged to allow performing a series of optical spot measurements on the activated display; and a processing unit comprising a memory unit that is provided with computer instructions, the processing unit being operatively connected with at least one of the 2D imaging system and the spot measurement system for receiving the measurement results for the optical characteristic of the activated display in the memory unit, wherein the computer instructions, when being executed on said measurement results, perform the steps of configuring the 2D imaging system to perform each optical measurement of the series of optical measurements as a sequence of measurements to obtain for each optical measurement a respective set of measurement results for the optical characteristic; and determining for each optical measurement of the series of optical measurements a respective value for the optical characteristic by performing time-averaging of the measurement results of the respective set of measurement results of the respective optical measurement, to determine based on said measurement results, values for the optical characteristic with the improved accuracy, and wherein the 2D imaging system comprises a beam splitter that is configured and arranged to enable a spot measurement and a 2D image measurement to be performed simultaneously on the activated display.

* * * * *